US012658396B2

(12) United States Patent
Douglass et al.

(10) Patent No.: US 12,658,396 B2
(45) Date of Patent: Jun. 16, 2026

(54) APPLICATION OF CHAMBERED OIL FUSE

(71) Applicant: Eaton Intelligent Power Limited, Dublin (IE)

(72) Inventors: Robert Stephen Douglass, Wildwood, MO (US); Gautam Sharma, Pune (IN)

(73) Assignee: EATON INTELLIGENT POWER LIMITED, Dublin (IE)

( * ) Notice: Subject to any disclaimer, the term of this patent is extended or adjusted under 35 U.S.C. 154(b) by 146 days.

(21) Appl. No.: 18/314,701

(22) Filed: May 9, 2023

(65) Prior Publication Data

US 2024/0379314 A1 Nov. 14, 2024

(51) Int. Cl.
*H01H 85/175* (2006.01)
*H01H 33/22* (2006.01)
*H01H 69/02* (2006.01)
*H01H 85/18* (2006.01)
*H01H 85/40* (2006.01)

(52) U.S. Cl.
CPC .......... *H01H 85/175* (2013.01); *H01H 33/22* (2013.01); *H01H 69/02* (2013.01); *H01H 85/18* (2013.01); *H01H 85/40* (2013.01)

(58) Field of Classification Search
CPC ...... H01H 85/175; H01H 85/38; H01H 33/22; H01H 69/02; H01H 85/18; H01H 2085/388; H01H 85/40
See application file for complete search history.

(56) References Cited

U.S. PATENT DOCUMENTS

| | | | | |
|---|---|---|---|---|
| RE19,097 E * | 2/1934 | Ringwald | H01H 85/38 | 337/275 |
| 3,710,295 A * | 1/1973 | Staub | H01H 85/046 | 337/204 |
| 3,958,206 A * | 5/1976 | Klint | H01H 85/38 | 337/296 |
| 4,058,785 A * | 11/1977 | Frind | H01H 85/40 | 337/204 |
| 4,091,353 A * | 5/1978 | Fisk | H01H 85/38 | 337/204 |
| 4,167,723 A * | 9/1979 | Wilks | H01H 85/42 | 337/273 |
| 4,313,099 A * | 1/1982 | Ackermann | H01H 85/18 | 218/90 |
| 4,570,043 A * | 2/1986 | Lloyd | H01B 3/24 | 252/570 |
| 4,947,149 A * | 8/1990 | Pimpis | B29B 15/122 | 337/273 |
| 5,296,832 A * | 3/1994 | Perreault | H01H 85/153 | 337/201 |
| 2012/0019347 A1* | 1/2012 | Goedde | H01H 85/042 | 337/246 |

* cited by examiner

*Primary Examiner* — Jacob R Crum
(74) *Attorney, Agent, or Firm* — Eckert Seamans Cherin & Mellott, LLC

(57) ABSTRACT

In one embodiment, a fuse assembly comprises a fuse element, an inner chamber comprising arc-quenching liquid, and an outer chamber housing the inner chamber. At least a portion of the fuse element is housed inside the inner chamber. The inner chamber is configured to rupture during an arc event. The outer chamber comprises filler material.

14 Claims, 2 Drawing Sheets

APPLICATION OF CHAMBERED OIL FUSE

TECHNICAL FIELD

This disclosure generally relates to fuse, and more particularly to a fuse assembly having a double-chamber configuration.

BACKGROUND

Various fuse designs have been produced in the past for use in applications where current load changes rapidly such as in electrical vehicles. In these scenarios, due to sudden energization and de-energization of an associated electric circuit, the fuse will experience extreme heating and cooling cycles and therefore subject to mechanical and/or thermal fatigue. This causes the fuse to wear down quickly and lowers its current carrying capacity. In addition, when load current fluctuates thereby abruptly generating a large amount of heat, the fuse may be caused to operate unintentionally. Typically, a traditional type of fuse uses heat-conductive materials (e.g., oil) to enclose a fuse element in order to quench an arc generated in the fuse. In such configurations, however, when the fuse opens, excess oil heated to hazardous temperature may spread out to its surroundings. This presents safety issues.

Accordingly, there is a need for a fuse assembly that enables cooling of the fuse element and at the same time safely contains an arc-quenching liquid within the fuse to avoid undesired spillage.

SUMMARY OF PARTICULAR EMBODIMENTS

This disclosure presents a fuse assembly constructed with two chambers, in which an inner chamber comprises at least a portion of a fuse element encapsulated by an arc-quenching liquid, and an outer chamber houses the inner chamber. In particular, the outer chamber utilizes sand filler and liquid absorbing material for confining liquid inside the outer chamber in case the inner chamber breaks during an arc event so as to avoid hazardous leakage. This disclosure moreover presents a method of manufacturing a fuse assembly having the dual chamber configuration.

An embodiment of a fuse assembly comprises a fuse element, an inner chamber comprising arc-quenching liquid, and an outer chamber housing the inner chamber. At least a portion of the fuse element is housed inside the inner chamber. The inner chamber is configured to rupture during an arc event. The outer chamber comprises filler material.

In particular embodiments, the inner chamber is configured to release the arc-quenching liquid after rupturing. In particular embodiments, the filler material is configured to assist containing the arc-quenching liquid within the outer chamber when the inner chamber ruptures and releases the arc-quenching liquid during an arc event. In particular embodiments, the outer chamber further comprises liquid absorbing material. In particular embodiments, the liquid absorbing material is sheet material lined on an inner surface of the outer chamber. In particular embodiments, the liquid absorbing material is fire retardant. In particular embodiments, the inner chamber comprises two end disks. In particular embodiments, the two end disks are configured to keep the inner chamber centered within the outer chamber. In particular embodiments, the arc-quenching liquid is oil. In particular embodiments, the inner chamber and the outer chamber are tubular in structure. In particular embodiments, the fuse element axially extends through the inner chamber and is conductively coupled to two end covers of the outer chamber.

An embodiment of a method of manufacturing a fuse assembly comprises positioning an inner chamber inside an outer chamber, coupling the inner chamber to a first end cover of the outer chamber, filling a space between the inner chamber and the outer chamber with filler material, coupling the inner chamber to a second end cover of the outer chamber, and fixing the second end cover to the outer chamber such that the outer chamber encloses the inner chamber and the filler material. The inner chamber comprises arc-quenching liquid and houses at least a portion of a fuse element. The inner chamber is configured to rupture during an arc event.

In particular embodiments, the inner chamber is configured to release the arc-quenching liquid after rupturing. In particular embodiments, the outer chamber further comprises liquid absorbing material. In particular embodiments, the filler material and the liquid absorbing material are configured to assist containing the arc-quenching liquid within the outer chamber when the inner chamber ruptures and releases the arc-quenching liquid during an arc event. In particular embodiments, the liquid absorbing material is sheet material lined on an inner surface of the outer chamber. In particular embodiments, the liquid absorbing material is fire retardant. In particular embodiments, the inner chamber comprises two end disks. The two end disks are configured to keep the inner chamber centered within the outer chamber. In particular embodiments, the arc-quenching liquid is oil. In particular embodiments, the inner chamber and the outer chamber are tubular in structure. In particular embodiments, the fuse element axially extends through the inner chamber. In particular embodiments, the method further comprises conductively coupling two terminals of the fuse element to the first end cover and the second end cover respectively.

BRIEF DESCRIPTION OF THE DRAWINGS

Embodiments in accordance with this disclosure will now be described by reference to the accompanying drawings, in which.

DESCRIPTION OF EXAMPLE EMBODIMENTS

This disclosure presents a fuse assembly with a dual chamber configuration. In particular, the fuse assembly according to this disclosure utilizes an inner chamber encapsulated with arc-quenching liquid (e.g., oil) to contain at least a portion of a fuse element and an outer chamber that encloses the inner chamber. The outer chamber is filled with sand filler and lined with liquid absorbing material such that when the inner chamber ruptures and releases the arc-quenching liquid—for example, during an arc event where the fuse opens—the sand filler and the liquid absorbing material may help contain the non-vaporized portion of the arc-quenching liquid, as well as providing additional arc quenching effects themselves.

Figure 1:
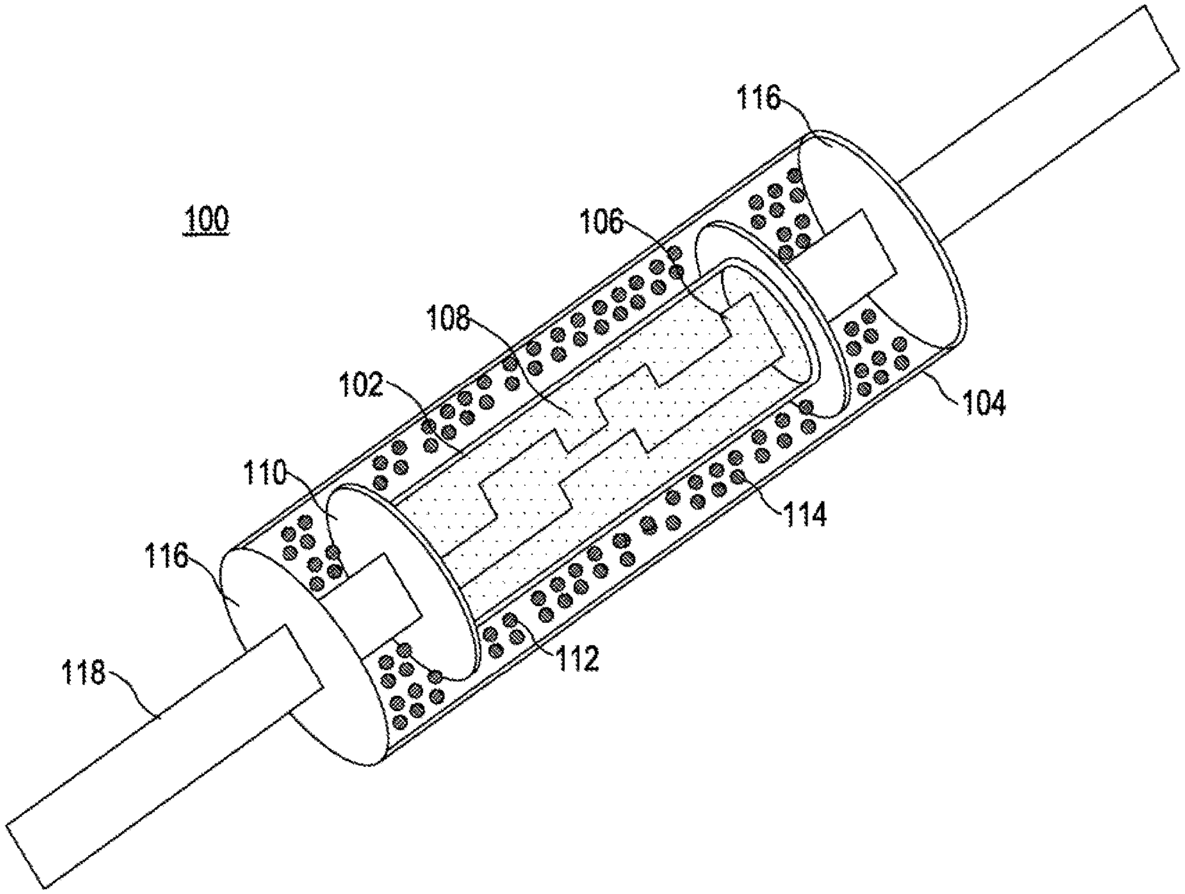
FIG. 1 illustrates a fuse assembly.

FIG. 1 illustrates a fuse assembly 100 in accordance with one embodiment of this disclosure. In particular embodiments, the fuse assembly 100 may comprise an inner chamber 102 and an outer chamber 104 that houses the inner chamber 102. The inner chamber 102 and the outer chamber 104 may be made of electric insulating materials such as glass, plastic, insulated metal, or other suitable materials as familiar to those skilled in the art. As shown, the inner chamber 102 and the outer chamber 104 are depicted as tubular in structure. While illustrated as such, the structures of these two chambers are not so limited to the tubular format. Other suitable structures (e.g., elongated, rounded, etc.) of the inner and outer chambers are also envisioned by this disclosure for performing the desired fuse function.

In particular embodiments, the inner chamber 102 may house at least a portion of a fuse element 106. The fuse element 106 may be made of copper, silver, or other suitable conducting metal material. As shown in the embodiment of FIG. 1, portion of the fuse element 106 contained inside the inner chamber 102 is advantageously configured with one or more reduced cross sections having weaker mechanical or thermal properties than other portions of the fuse element 106. In this way, when exposed to high current load or temperature, the cross sections may be prone to melting such that when melted, portion of the fuse element 106 is disconnected from another, thereby interrupting current flow and achieving overcurrent protection of the associated overall electric circuit. These cross sections may be referred to as melting areas or weak points. While shown in a step-like configuration having one or more bends, it will be understood that the melting areas of the fuse element 106 may take form in any suitable shapes or geometries such as a ribbon, a wire, a strip or the like for performing proper circuit protection. In the embodiment of FIG. 1, portions of the fuse element 106 corresponding to the weak points may be enclosed by the inner chamber 102 in a sealed manner. Each end of the fuse element 106 may extend outwards from the inner chamber 102 in a way so as to establish electrical connection with other conducting components (e.g., end covers 116, as will be explained in greater detail below) external to the inner chamber 102. Alternatively, though not shown, the entirety of the fuse element 106 may be encapsulated by the inner chamber 102. In such cases, suitable conducting terminals, connectors or the like may be provided at the ends of the inner chamber 102 for enabling electrical connection with the fuse element 106.

In the embodiment of FIG. 1, the inner chamber 102 may encapsulate arc-quenching liquid 108 in such a way that a portion of the fuse element 106 housed within the inner chamber 102 is surrounded by or submerged in the arc-quenching liquid 108. The arc-quenching liquid 108 may be oil, wax, water, or other suitable dielectric liquid. In particular embodiments, the arc-quenching liquid 108 may be laded with certain quenching or cooling elements such as hydrogen, oxygen, nitrogen, fluorine or the like. When exposed to high temperature in the case of current overload, the arc-quenching liquid 108 may release large amount of gas by means of phase change and decomposition, thereby providing cooling effect and suppressing the electric arc generated on the fuse element 106. Further, the arc-quenching liquid 108 may be used as a cooling medium to control the heat, which is particularly useful in scenarios where a fuse experiences random current pulses or otherwise undergoes constant heating cycles, such as in operations of electric vehicles due of their radical acceleration and deacceleration profile. In this way, mechanical fatigue of the fuse element 106 may be lessen and prolong the fuse's service life.

In particular embodiments, each of the two ends of the inner chamber 102 is provided with an end disk 110. As a non-limiting example, the end disks 110 may be attached to both ends of the inner chamber 102 respectively by adhesive materials such as silicone adhesive so as to substantially seal off the inner chamber 102 in a liquid tight manner. In this way, unintentional liquid (i.e., the arc-quenching liquid 108) leakage may be prevented. Additionally or alternatively, the end disk 110 may act as a spacer for keeping the inner chamber 102 centered inside the outer chamber 104 such that the inner chamber 102 and the outer chamber 104 are positioned generally coaxially with each other. While depicted as a circular disk, this disclosure also contemplates other suitable geometries of the end disk 110. For example, the end disk 110 may be triangular, star-shaped, spider-shaped, just to name a few.

As further shown in FIG. 1, the outer chamber 104 is provided which houses the inner chamber 102. For example, the outer chamber 104 may have a body made of ceramic, glass melamine composites, glass phenolic composites, glass epoxy composites, regular glass, or other suitable material known in the field. In particular embodiments, interior of the outer chamber 104 may contain a filler material 112 such as sand that is typically used for arc quenching purposes. As an example and not by way of limitation, the sand filler 112 may fill the space between the inner chamber 102 and the outer chamber 104 so that the inner chamber 102 is surrounded by the sand filler 112. In this way, in the event of arcing where the inner chamber 102 breaks under high temperature and/or pressure, the sand filler 112 may disperse and cover the arcing area, thereby maintaining dielectric strength of the overall assembly. Further, during normal operation of the fuse, the sand filler 112 may act as part of a thermal system for facilitating thermal management and alleviating temperature fluctuation. In addition, in the embodiment of FIG. 1, a liquid absorbing sheet may be arranged in the inner space of the outer chamber 104. An example of a liquid absorbing sheet is an oil absorbing sheet. The oil absorbing sheet 114 may be lined, layered or otherwise configured in the outer chamber 104, for example, on the inner surface of the outer chamber. The oil absorbing sheet 114 may be fire retardant. Alternative to the liquid absorbing sheet, an oil absorbing fire-retardant granular material or the like could be used to achieve the desired function of this disclosure. During fuse operation when there exists high pressure due to arc or high heat in the case of overload, the inner chamber 102 may rupture and release the arc-quenching liquid 108 contained therein. Due to the extreme heat and/or pressure a portion of the arc-quenching liquid 108 may vaporize into gas or vapor. Any remaining arc-quenching liquid 108 may be substantially absorbed and prevented from spreading out by the sand filler 112 and/or the oil absorbing sheet 114. Containing the arc-quenching liquid within the fuse assembly is critical to minimize a risk of fire hazard. Additionally, the sand filler 112 and/or the oil absorbing sheet 114 may also provide insulative properties such that if an arc were ensued into the sand filler 112 and/or the oil absorbing sheet 114, the sand filler 112 and/or the oil absorbing sheet 114 may further maintain dielectric strength and facilitate extinguishing the arc.

In order to keep the sand filler 112 and the oil absorbing sheet 114 inside the outer chamber 104, in particular embodiments, an end cover 116 may be fitted to each end of the outer chamber 104. As an example and not by way of limitation, the end covers 116 may be mechanically secured or glued (via adhesive material) to the outer chamber 104 in order to close off the two opening ends of the outer chamber 104. In particular embodiments, each end cover 116 may be conductively coupled to respective terminal end of the fuse element 106 extending out of the inner chamber 102 so as to establish electrical connection. As a non-limiting example, ends of the fuse element 106 may be welded or soldered to the inner sides of the end covers 116 or otherwise conductively attached thereto. In particular embodiments, the end cover 116 may be made of metal, plastic, composite material, or other suitable materials. In particular embodiments, the outer side of each end cover 116 may be configured with a blade terminal 118 for conductively connecting the fuse assembly 100 to an electric circuit (not shown). Of course, though described in this particular manner, it will be appreciated that the end cover 116 may be configured differently. For example, the end cover 116 may instead be a fuse cap or a fuse ferrule as familiar to those skilled in the art.

Configured in this way, the fuse assembly in accordance with this disclosure can advantageously reduce the mechanical and/or thermal fatigue experienced by a fuse, thereby prolonging the life cycle of the fuse. This may be especially useful in applications where current load changes are sudden such as in cranes and electric vehicles, in particular, because the arc-quenching liquid as disclosed herein may increase the thermal time constant of the overall fuse assembly and prevent rapid heat fluctuations experienced by the fuse. By distributing the heat generated by the fuse element throughout the arc-quenching liquid and its surroundings, embodiments disclosed herein also prevent abrupt heat generation and prevent the fuse from unintended operations. Furthermore, the fuse assembly of this disclosure may improve arc quenching performance and help extinguish the arc quicker than traditional designs, further improving the safety of operating such fuses.

Moreover, by surrounding the inner chamber with sand filler and liquid absorbing material, excess liquid that is not decomposed or vaporized may be absorbed and contained inside the fuse assembly. This prevents inadvertent liquid leakage into surrounding environment and avoids fire hazard and damage to the overall system.

The technical advantages explained above are meant only as an example and not as a limitation. Certain embodiments disclosed herein may provide none, some, or all of the above technical advantages. One or more other technical advantages may be readily apparent to one skilled in the art in view of the figures, descriptions, and claims of this disclosure.

An example method of manufacturing the fuse assembly (e.g., the fuse assembly 100 of FIG. 1) according to this disclosure is described with reference to FIG. 2. At step 202, an inner chamber is provided, which, similar to the inner chamber 102 of FIG. 1, may encapsulate arc-quenching liquid and house at least a portion of a fuse element. In particular embodiments, the inner chamber 102 may be preassembled as a subassembly before the inner chamber is assembled with the rest of the fuse assembly components. As an example and not by way of limitation, in order to form the inner chamber having such a configuration, the fuse element may be placed in the inner chamber. Then one end of the inner chamber may be sealed for example by a heating method where material (e.g., glass, plastic, etc.) forming the inner chamber is melted over portions of the fuse element. Additionally or alternatively, an end disk may be attached (for example, by way of adhesion) at the end of inner chamber for providing tight sealing. Thereafter, arc-quenching liquid may be introduced into the inner chamber, filling the remaining interior space of the inner chamber. The other end of the inner chamber may be similarly closed off either through heating or by a second end disk glued thereto. In this manner, the inner chamber assembly is formed with the arc-quenching liquid and portions of the fuse element hermetically sealed inside. In particular embodiments, the inner chamber is then positioned inside an outer chamber. As an example, the end disks described above may additionally or alternatively serve to align the inner chamber coaxially with the outer chamber.

At step 204, one end of the inner chamber is conductively coupled to a first end cover 116 of the outer chamber. In embodiments where a portion of the fuse element is contained within the inner chamber while two terminal ends of the fuse element axially extend outside the inner chamber, one of the ends of the fuse element may be conductively coupled to the first end cover 116 by means of soldering, welding, or other suitable connecting methods. Alternatively or optionally, the inner chamber may be provided with a conductive end structure for connecting to the first end cover 116. In some embodiments, the first end cover 116 may be mechanically affixed to an opening end of the outer chamber such as by crimping, bolting, pinning, snap-fitting or the like.

At step 206, once the inner chamber is secured in place within the outer chamber, filler material (e.g., sand) may be presented to the interior of the outer chamber so as to fill the space between the inner chamber and the outer chamber. In particular embodiments, the outer chamber may be configured with liquid absorbing materials. For example, the liquid absorbing material may be a sheet material that is lined or layered inside the outer chamber (e.g., inner surface). Alternatively, the liquid absorbing material may be granular material or other suitable materials having desired liquid absorbing characteristics. Provided as such, in the event of arcing where the inner chamber is subject to high pressure or temperature and therefore breaks to release the arc-quenching liquid, excess arc-quenching liquid may disperse into the sand filler and/or the liquid absorbing material and be absorbed.

At step 208, the other end of the inner chamber is conductively coupled to a second end cover 116 of the outer chamber in a similar manner as described above. For example, the other terminal of the fuse element extending outwards from the inner chamber may be welded or soldered to the second end cover. Alternatively, a second end structure may be provided to the inner chamber for connecting the other end of the inner chamber to the second end cover. At step 210, the second end cover 116 is fixed to the corresponding opening end of the outer chamber. Again, this may be done mechanically such as through crimping, bolting, and so on. Accordingly, the fuse assembly having the dual chamber configuration is constructed.

Figure 2:
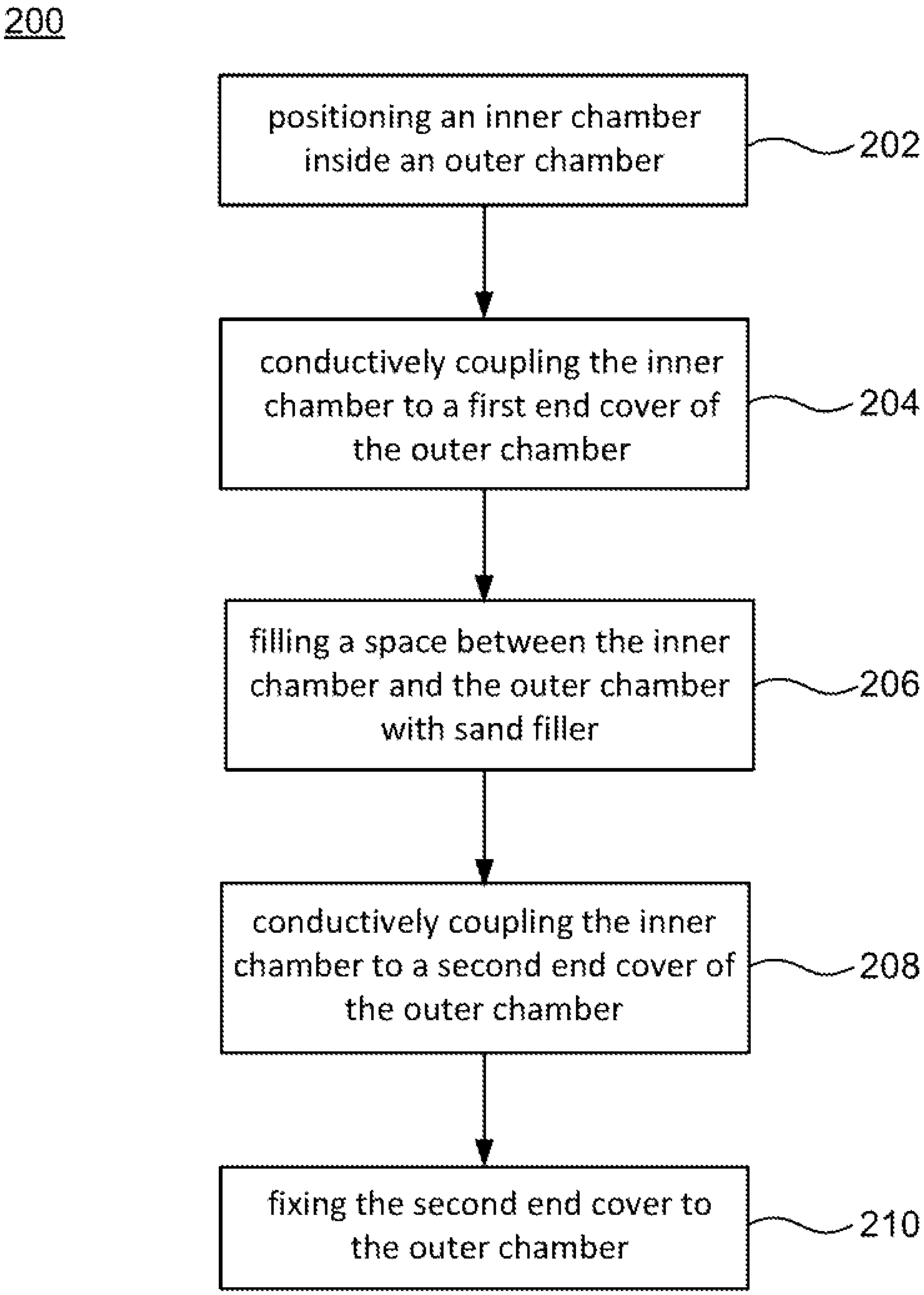
FIG. 2 illustrates a flow diagram of a manufacturing process of a fuse assembly.

It should be appreciated that any step, sub-step, operation, or block of method 200 may be performed in an order or arrangement different from the embodiments illustrated by FIG. 2. In some embodiments, one or more steps may be omitted from or added to the method. For example, in some embodiments, the second end cover 116 may be coupled to the inner chamber and/or fuse element and close off the opening end of the outer chamber. Sand filler may then be introduced into the outer chamber for example through optional openings (not illustrated) disposed on the end covers. Thereafter, a plug may be provided for sealing the opening so as to form the outer chamber encapsulating the sand filler.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A fuse assembly comprising:

a fuse element;

an inner chamber comprising arc-quenching liquid, wherein at least a portion of the fuse element is housed inside the inner chamber, wherein the inner chamber is configured to rupture during an arc event, and wherein each end of the inner chamber is attached to an end disk by adhesive material to seal off the inner chamber in a liquid tight manner and to prevent leakage of the arc-quenching liquid from the inner chamber, and wherein the end disks are configured as a spacer to keep the inner chamber centered inside an outer chamber, each end disk having a diameter greater than a diameter of the inner chamber; and the outer chamber housing the inner chamber, wherein the outer chamber comprises filler material, wherein the outer chamber further comprises liquid absorbing sheet material that is lined on an inner surface of the outer chamber.

2. The fuse assembly of claim 1, wherein the inner chamber is configured to release the arc-quenching liquid after rupturing.

3. The fuse assembly of claim 1, wherein the filler material is configured to assist containing the arc-quenching liquid within the outer chamber when the inner chamber ruptures and releases the arc-quenching liquid during an arc event.

4. The fuse assembly of claim 1, wherein the liquid absorbing material is fire retardant.

5. The fuse assembly of claim 1, wherein the arc-quenching liquid is oil.

6. The fuse assembly of claim 1, wherein the inner chamber and the outer chamber are tubular in structure.

7. The fuse assembly of claim 1, wherein the fuse element axially extends through the inner chamber and is conductively coupled to two end covers of the outer chamber.

8. A method of manufacturing a fuse assembly, the method comprising:

positioning an inner chamber inside an outer chamber, wherein the inner chamber comprises arc-quenching liquid and houses at least a portion of a fuse element, wherein the inner chamber is configured to rupture during an arc event, and wherein each end of the inner chamber is attached to an end disk by adhesive material to seal off the inner chamber in a liquid tight manner and to prevent leakage of the arc-quenching liquid from the inner chamber, and wherein the end disks are configured as a spacer to keep the inner chamber centered inside the outer chamber, each end disk having a diameter greater than a diameter of the inner chamber;

coupling the inner chamber to a first end cover of the outer chamber;

filling a space between the inner chamber and the outer chamber with filler material;

coupling the inner chamber to a second end cover of the outer chamber; and fixing the second end cover to the outer chamber such that the outer chamber encloses the inner chamber and the filler material, wherein the outer chamber comprises liquid absorbing sheet material that is lined on an inner surface of the outer chamber.

9. The method of claim 8, wherein the inner chamber is configured to release the arc-quenching liquid after rupturing.

10. The method of claim 8, wherein the filler material and the liquid absorbing material are configured to assist containing the arc-quenching liquid within the outer chamber when the inner chamber ruptures and releases the arc-quenching liquid during an arc event.

11. The method of claim 8, wherein the liquid absorbing material is fire retardant.

12. The method of claim 8, wherein the arc-quenching liquid is oil.

13. The method of claim 8, wherein the inner chamber and the outer chamber are tubular in structure.

14. The method of claim 8, wherein the fuse element axially extends through the inner chamber, and wherein the method further comprises conductively coupling two terminals of the fuse element to the first end cover and the second end cover respectively.

* * * * *